(12) United States Patent
Bovio et al.

(10) Patent No.: US 6,224,996 B1
(45) Date of Patent: May 1, 2001

(54) BATTERY HOUSING WALL INTERWEAVE WITH ALL OF SYSTEM ENCLOSURE TO REDUCE HEIGHT OF PORTABLE COMPUTER

(75) Inventors: Michele Bovio, Boston; Robert Frame, Westboro, both of MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/138,318

(22) Filed: Aug. 21, 1998

(51) Int. Cl.[7] .................................................. H01M 2/10

(52) U.S. Cl. .............................. 429/99; 429/100; 206/705

(58) Field of Search ................................ 429/99, 100, 98; 206/705; H01M 2/10

(56) References Cited

U.S. PATENT DOCUMENTS 5,534,366 * 7/1996 Hwang et al. ..................... 429/99 X
5,567,542 * 10/1996 Bae ..................................... 429/99

* cited by examiner

*Primary Examiner*—John S. Maples
(74) *Attorney, Agent, or Firm*—Conley, Rose & Tayon, P.C.

(57) ABSTRACT

A technique for reducing the height of a portable computer by reducing the effective number of housing walls across the height relates specifically to the system height over the battery slot. An enclosure of the portable computer, and specifically, a wall of the enclosure in the computer's battery slot is interwoven with a wall of the battery pack housing. The effect of the invention is that the total height of the portable computer measured through the portable computer's battery slot is reduced by the thickness of one of these walls. In one implementation, there is a reduction in the system's height of over a millimeter.

8 Claims, 2 Drawing Sheets

BATTERY HOUSING WALL INTERWEAVE WITH ALL OF SYSTEM ENCLOSURE TO REDUCE HEIGHT OF PORTABLE COMPUTER

BACKGROUND OF THE INVENTION

There is a high degree of uniformity in system configurations for desktop computer systems. Most desktop computers have one or more hard drives, an external monitor, a CDROM drive, and a floppy drive. This general system configuration is consistent within the product lines of vendors and across different vendors.

Uniformity in system configurations, however, does not exist in portable computers. It is not uncommon for a given vendor to offer portable computers that provide varying levels of portability. Some larger models will have all of the capabilities of desktop models, and will consequently be larger. In parallel, the vendor will also offer more streamlined models where features are sacrificed to augment portability. These computers will have one or no removable disk drives, small battery packs, and heightened low-power capabilities.

Especially in the smaller, more-portable end of the spectrum, the portable computer system designer becomes extremely sensitive to the system size versus capability tradeoff. To make the systems smaller, many times the size of the battery pack is reduced as are the number of bays for peripheral devices.

One part of the portable computer, however, can be optimized without any concomitant loss in system capability. This is the portable computer's enclosure. Space within it can be used more effectively and structural features of the system can be shared between various components to yield a system that has no loss in toughness yet is smaller and lighter.

SUMMARY OF THE INVENTION

The present invention is directed to a technique for reducing the height of a portable computer by reducing the effective number of housing walls across the height. It relates specifically to the system height over the battery slot.

According to the invention, an enclosure of the portable computer, and specifically, a wall of the enclosure in the computer's battery slot is interwoven with a wall of the battery pack housing. This is the battery pack that is inserted into the battery slot to power the portable computer.

The effect of the invention is that the total height of the portable computer measured through the portable computer's battery slot is reduced by the thickness of one of these walls. In one exemplary implementation, there is a reduction in the system's height by over a millimeter.

In specific embodiments, the battery pack comprises multiple battery cells housed within a wall, which contains the cells. The wall of the battery pack housing has structural regions over the battery cells that project through the battery slot wall of the enclosure. These structural regions of the battery pack housing give the battery pack the necessary rigidity, especially torsionally. This rigidity is required by the battery pack since it must have the capability of being self-supporting, especially when it is removed from the portable computer system for recharging or storage. These structural regions of the battery pack housing extend between fingered sections of the battery slot wall. The fingered sections preferably extend parallel to an axis of the battery cells of the battery pack and between the battery cells.

In the preferred embodiment, the wall of the battery pack also comprises reduced wall thickness regions where the thickness of the battery pack wall is reduced relative to the structural regions of the battery pack. Solid sections of the battery slot wall overlie these reduced wall thickness regions of the battery pack wall. Preferably, the reduced wall thickness regions alternate with the structural regions of the battery pack wall along the longitudinal axis of the battery pack. Correspondingly, the solid sections of the battery slot wall alternate with the fingered sections of the battery slot wall.

In the preferred embodiment, the battery slot is located under a palm rest of the portable computer system.

In general, according to another aspect, the invention also features a portable computer battery pack. The battery pack comprises battery cells and a battery pack housing surrounding the battery cells. A wall of the battery pack housing includes structural regions and reduced wall thickness regions where the thickness of the wall of the battery pack is reduced relative to the structural regions of the battery pack.

Finally, according to still another aspect, the invention also features a method for configuring a portable computer. This method comprises encasing the portable computer in an enclosure and providing a battery slot defined by at least one wall of the enclosure. Battery cells are encased within a battery pack housing. The battery pack is then inserted into the battery slot. A wall of the battery pack housing interweaves with a wall of the battery slot.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the drawings, like reference characters refer to the same parts throughout the different views. The drawings are not necessarily to scale, emphasis instead being placed upon illustrating the principles of the invention. Of the drawings.

DETAILED DESCRIPTION OF THE PREFERRED EMBODIMENTS

Figure 1:
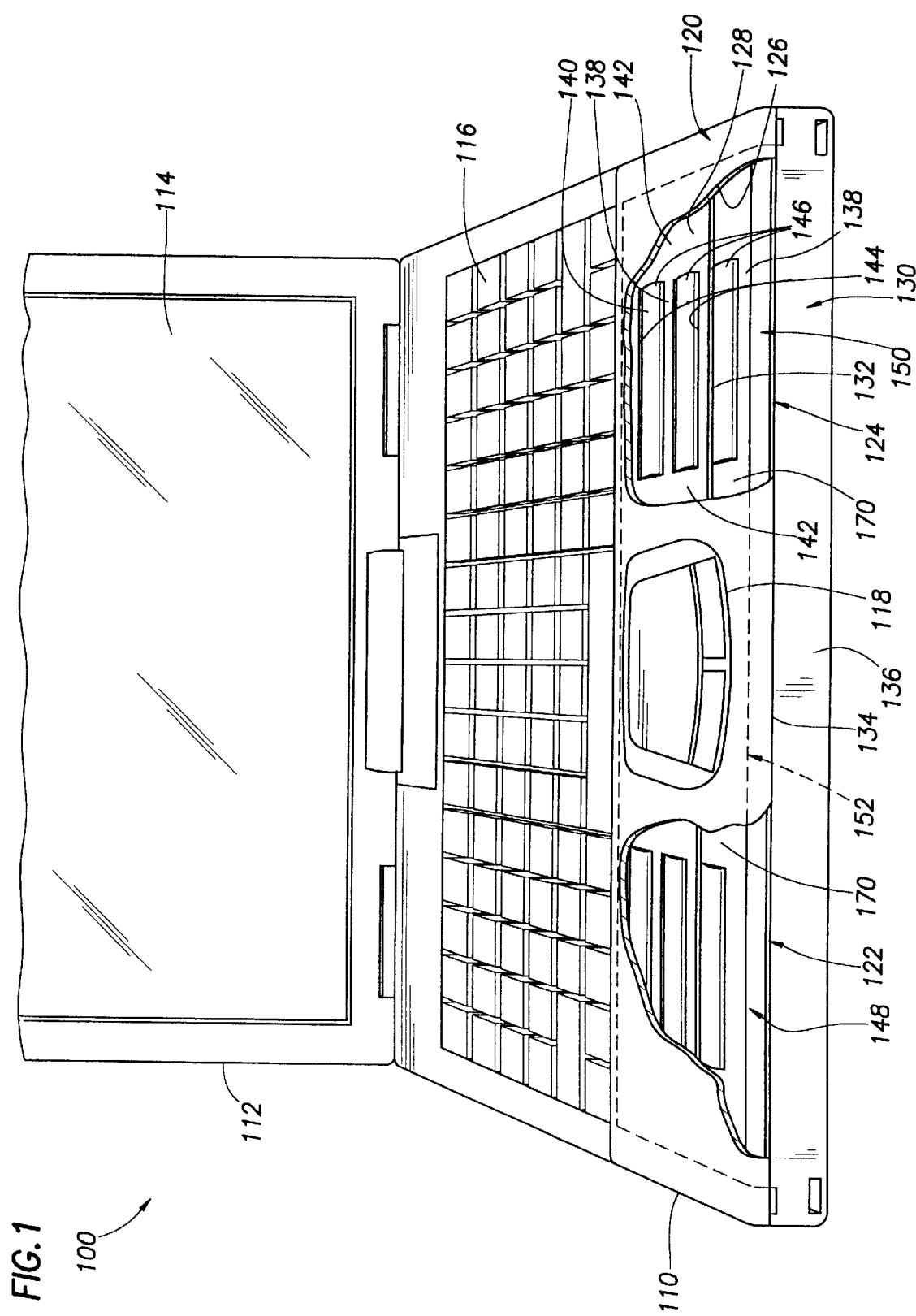
FIG. 1 is a perspective, partial cutaway view, of a portable computer system according to the present invention.

FIG. 1 shows a portable computer system 100, which has been constructed according to the principles of the present invention.

As is common, the portable computer 100 comprises a base 110 and a top cover 112 which closes over the base 110. The top cover 112 has a flat panel display 114. The base 110 comprises a keyboard 116 and contains the primary electronic components such as a central processing unit and disk drive, for example.

In the specific embodiment shown, a pointing device controller 118, specifically a touch pad, is located on a palm rest 120 in front of the keyboard 116. Two regions 122, 124 of the palm rest 120 are shown cutaway to illustrate the present invention.

The system enclosure under the palm rest 120 comprises two walls: an upper palm rest wall 126 and a lower battery slot wall 128. Together the palm rest wall 126 and the battery slot wall 128 define a battery slot in which battery pack 130 is installed. Specifically, the battery slot wall 128 defines the interior surface of the rearward, approximately, three quarters of the battery slot. The battery slot wall terminates at edge 132. The palm rest wall 126 extends beyond termination edge 132 to seam 134, which delineates the palm rest wall 126 of the computer system enclosure from the outer, bottom wall 136 of the housing of the battery pack 130.

According to the invention, the battery slot wall 128 of the computer system enclosure comprises solid sections 142 and fingered sections 138, which extend between the solid sections 142. Into the portals 144, defined by the fingered sections 138, structural regions 146 of the top battery pack wall of the battery pack housing extend.

In the preferred embodiment, there are three interweaves 148, 150, 152, two on either side of the portable computer system and a third 152 under the touch pad 118.

Figure 2:
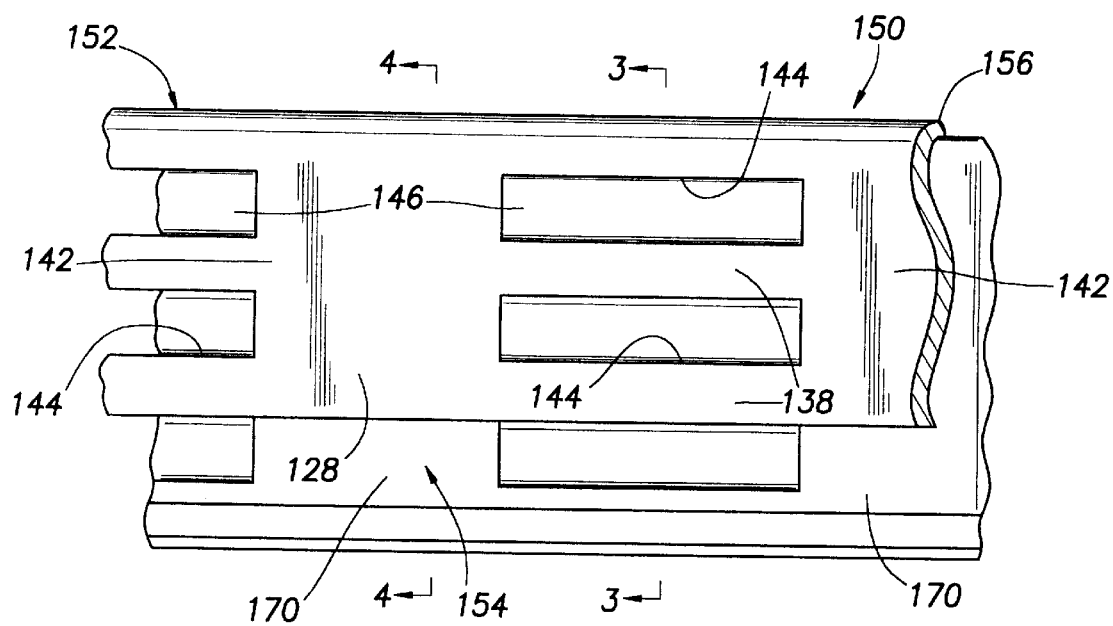
FIG. 2 is a top plan view showing interweaving of a battery slot wall of the enclosure of the computer system.

FIG. 2 is a more detailed view of two of the interweaves 152, 150.

To define the battery slot, the battery slot wall 128 moving rearward wraps around the battery pack housing 154 extending vertically at rear section 156.

FIG. 2 also shows portals 144 to accommodate the dome shaped structural regions 146 of the battery pack housing 154 and the solid sections 142 connected by a fingered section 138.

Figure 3:
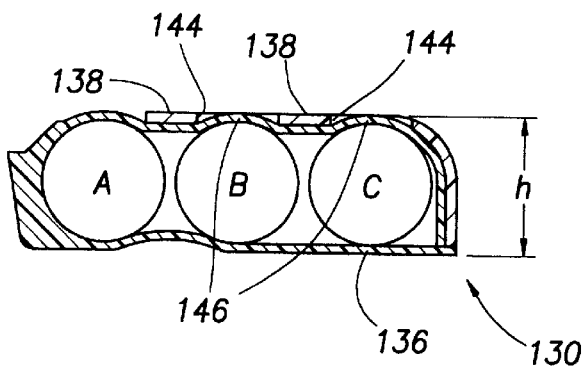
FIG. 3 is a cross-sectional view of the portable computer taken through a fingered section of the portable computer enclosure and a structural region of the battery pack housing.
Figure 4:
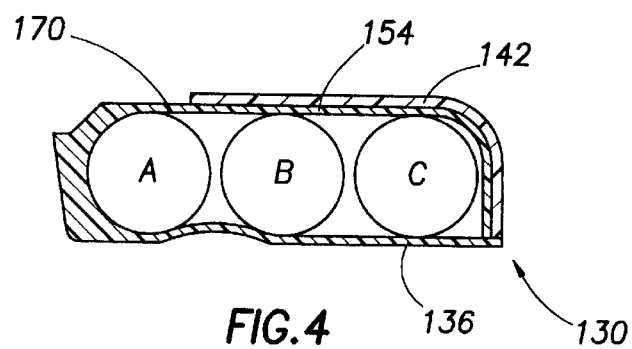
FIG. 4 is a cross-sectional view taken through reduced wall thickness region of the battery pack wall and solid section battery slot wall.

The advantages of the present invention are best illustrated by cross-sectional views FIGS. 3 and 4, which are taken through the structural regions 146 and reduced wall thickness regions 170, respectively, of the battery pack 130. The portals 144 between the fingered sections 138 of the battery slot wall 128 of the enclosure accommodate the structural regions 146 of the battery pack housing. These structural regions 146 have a thickness of approximately 1.2 millimeters (mm), which is enough to contain the relatively heavy battery cells A, B, C. Due to the portals, however, the total height h of the battery pack and battery enclosure wall equals the sum of only the diameter of the battery cell, A, B, C and the thickness of the structural regions 146 and the width of the bottom wall 136. The thickness of the battery slot wall 128 is effectively removed from this equation. In one implementation, the invention reduced the total system height by approximately 1.2 millimeters.

FIG. 4 is a cross section taken through the reduced wall thickness regions 170 of the battery pack. This shows the reduced wall regions 170 are much thinner than the structural regions 146 only being approximately 0.1 mm thick, or the thickness of a label. The thinness here is such that the reduced wall thickness regions would not be enough to contain the battery cells A, B, C and provide the battery pack with the necessary rigidity, if this wall thickness extended over the entire length of the battery pack 130.

In other embodiments, the portals 144 do not need to extend entirely through the thickness of the battery slot wall in order to achieve some of the advantages of the present invention. They could simply have a reduced thickness to accommodate the total thickness of the battery pack at the structural regions.

While this invention has been particularly shown and described with references to preferred embodiments thereof, it will be understood by those skilled in the art that various changes in form and details may be made therein without departing from the spirit and scope of the invention as defined by the appended claims. For example, those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A portable computer, comprising:
    an enclosure for the portable computer having a battery slot; and
    a battery pack including battery cells, said battery pack surrounded by a battery pack housing and inserted into the battery slot to power the portable computer, wherein a wall of the battery pack housing has structural regions over the battery cells that project into the battery slot wall of the enclosure.

2. A portable computer as described in claim 1, wherein the battery slot wall comprises fingered sections that extend parallel to an axis of the battery cells of the battery pack between battery cells.

3. A portable computer as described in claim 2, wherein the wall of the battery pack comprises reduced wall thickness regions where the thickness of the battery pack wall is reduced relative to the structural regions of the battery pack wall.

4. A portable computer as described in claim 3, wherein solid sections of the battery slot wall overlie the reduced wall thickness regions of the battery pack wall.

5. A portable computer as described in claim 4, wherein the reduced wall thickness regions alternate with the structural regions of the battery pack wall along a longitudinal axis of the battery pack.

6. A portable computer as described in claim 5, wherein solid sections of the battery slot wall alternate with the fingered sections of the battery slot wall.

7. A portable computer as described in claim 1, wherein the battery slot is under a palm rest of the portable computer.

8. A portable computer, comprising:
    an enclosure for the portable computer having a battery slot under a palm rest, a battery slot wall comprising solid sections alternating with fingered sections; and
    a battery pack containing battery cells which are surrounded by a battery pack housing and inserted into the slot to power the portable computer, a wall of the battery pack having structural regions over the battery cells that project between the fingered sections of the battery slot wall of the enclosure and reduced wall thickness regions, which underlie the solid sections of the battery slot wall, where the thickness of the reduced wall thickness regions of the battery pack wall are reduced relative to the structural regions of the battery pack wall.

* * * * *